Feb. 14, 1950 — R. W. ARMSTRONG ET AL — 2,497,430
FILM LOADING APPARATUS
Filed Sept. 15, 1945 — 7 Sheets-Sheet 2
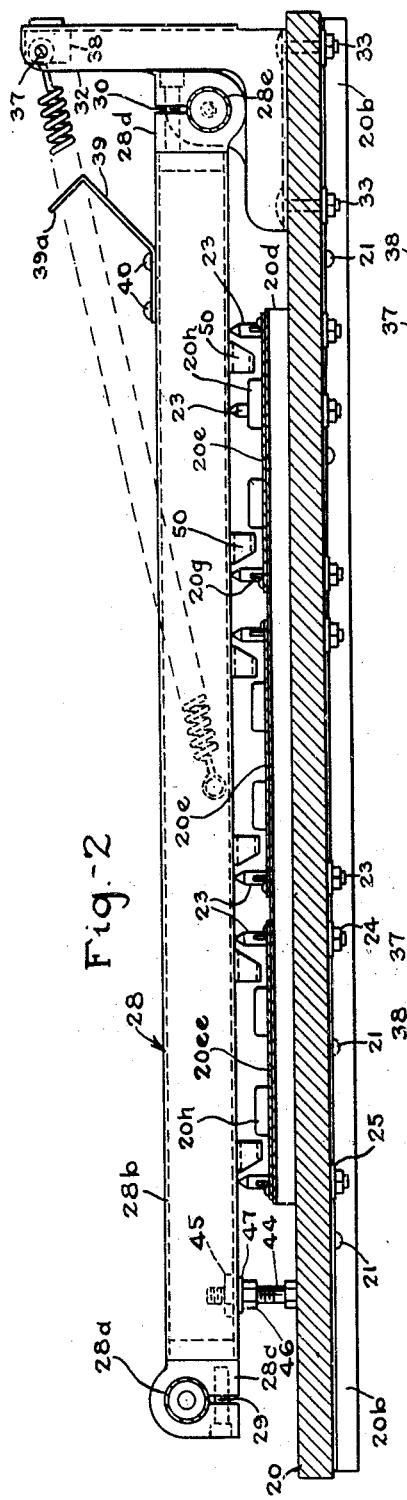
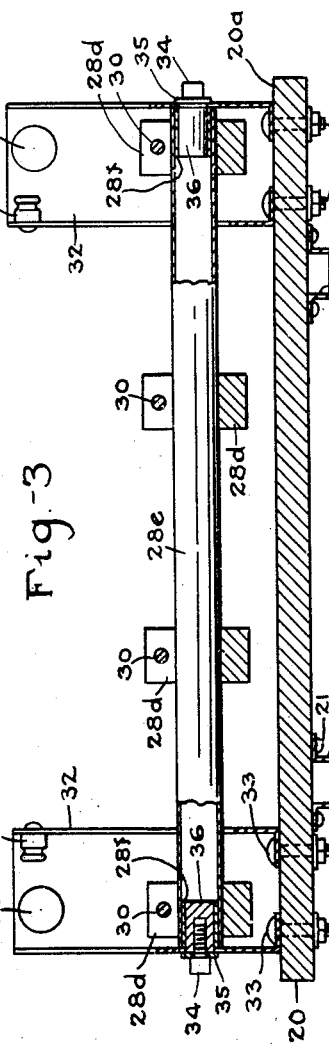
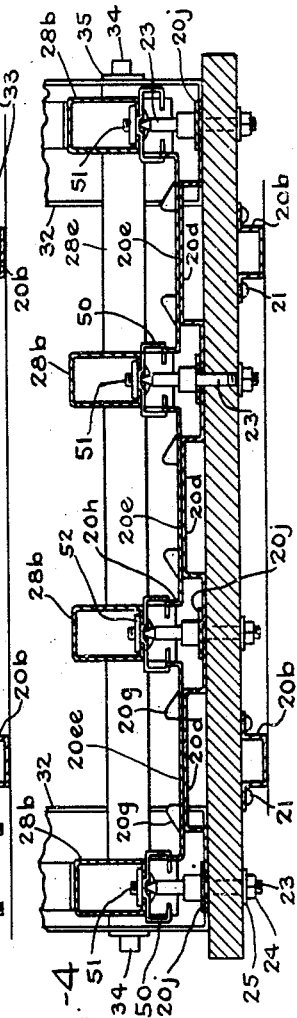
Inventors:
ROBERT W. ARMSTRONG
ROBERT SARDESON
EDWARD H. SAVELA
By Chas. C. Reif
Attorney.

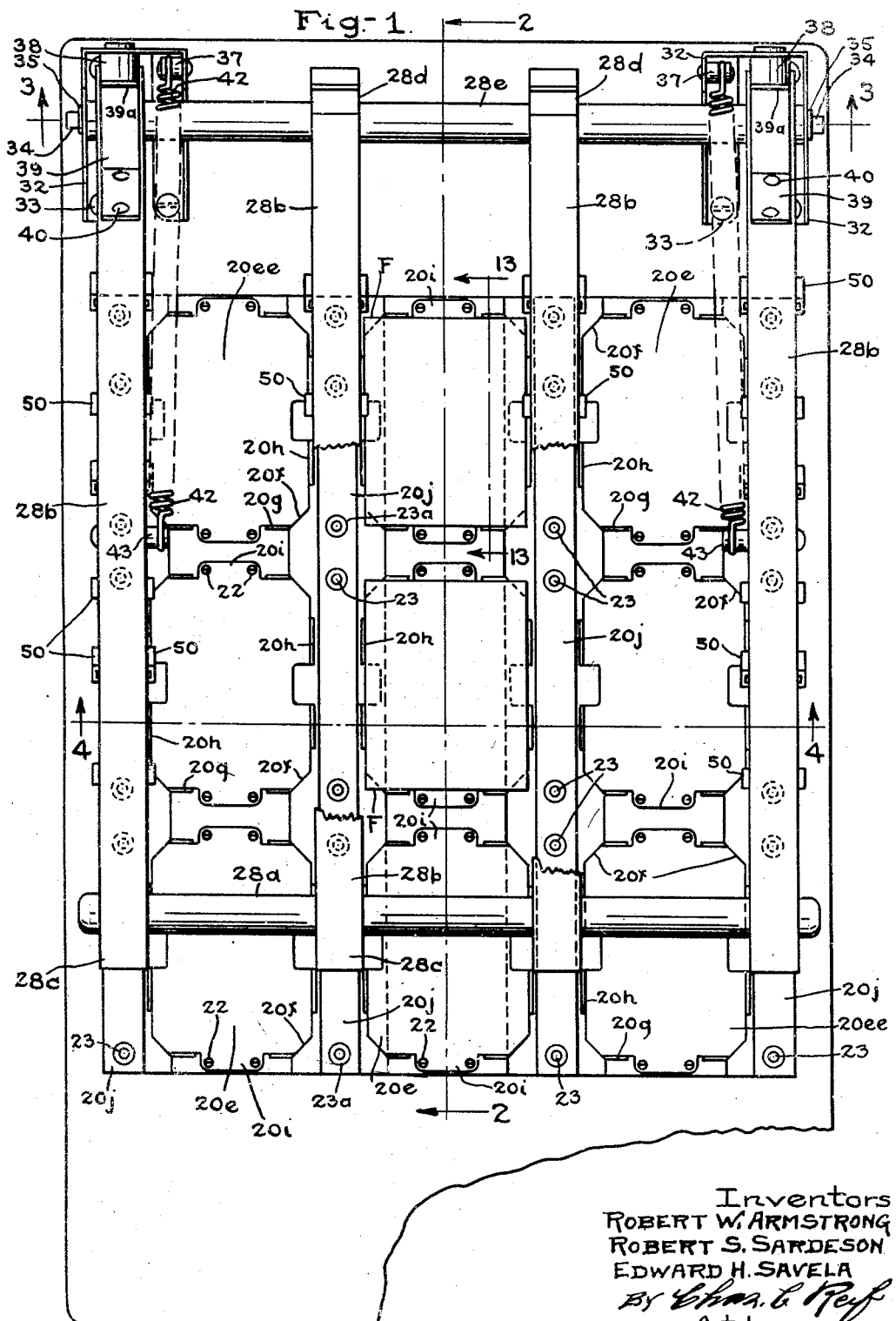

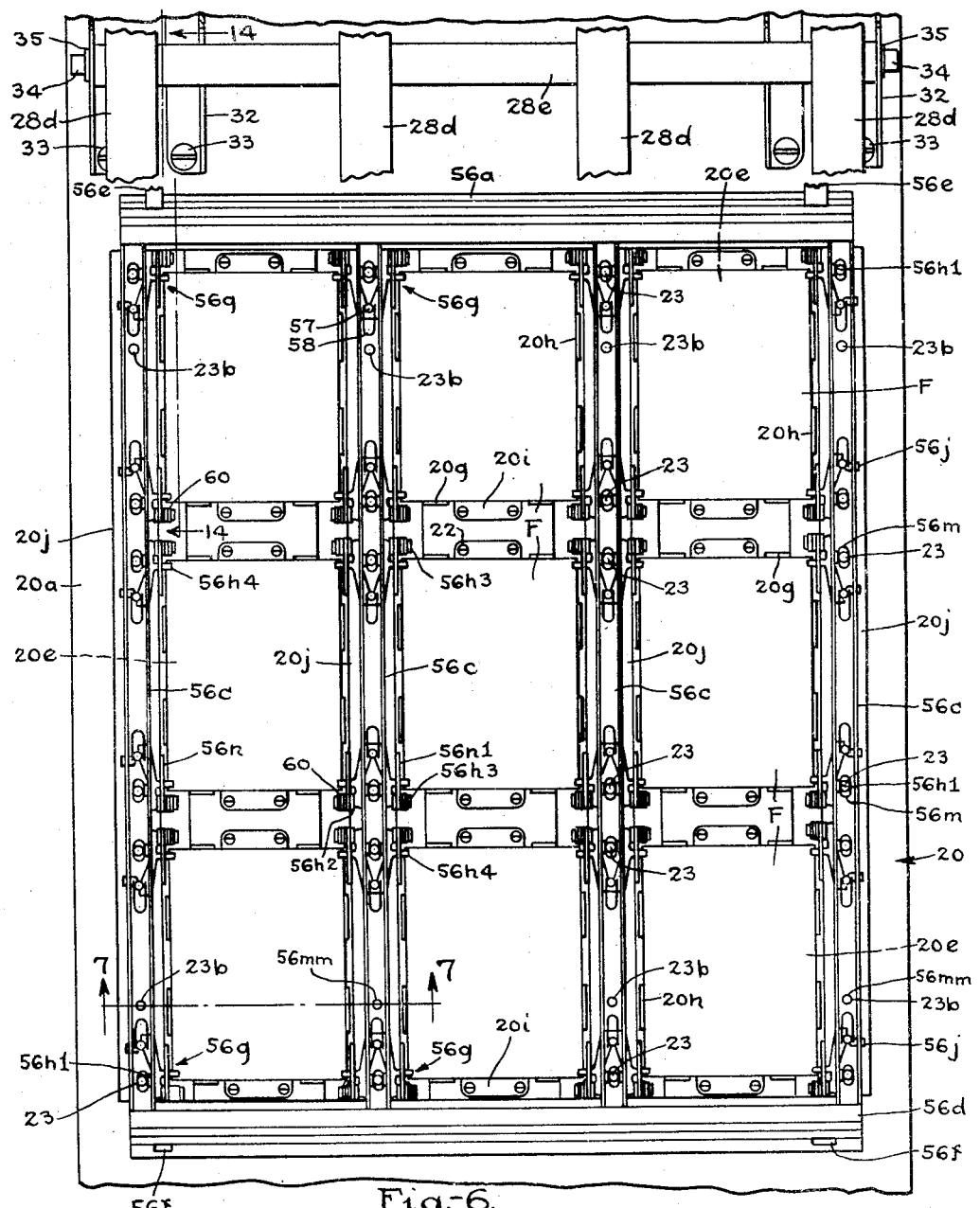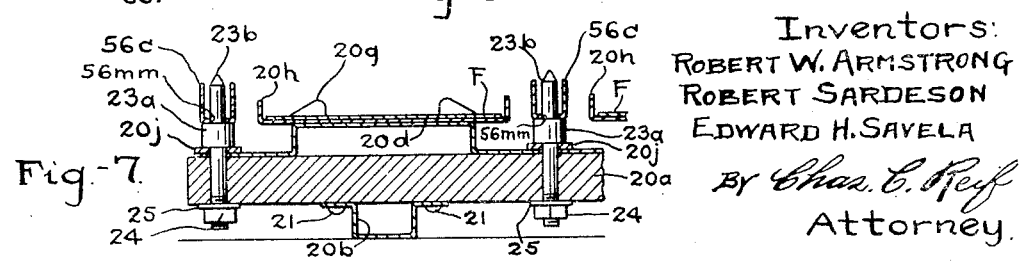

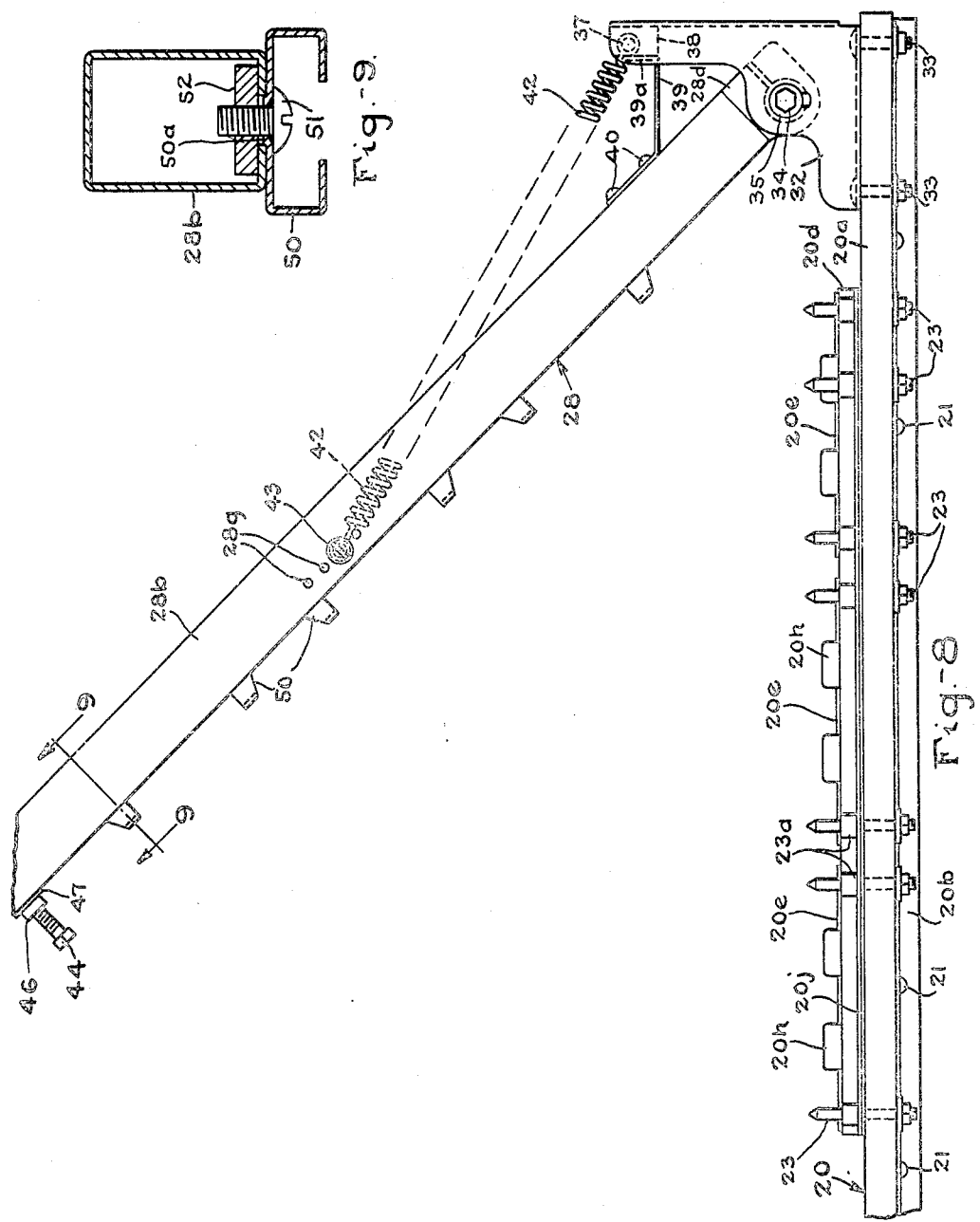

Feb. 14, 1950    R. W. ARMSTRONG ET AL    2,497,430
FILM LOADING APPARATUS
Filed Sept. 15, 1945    7 Sheets-Sheet 5
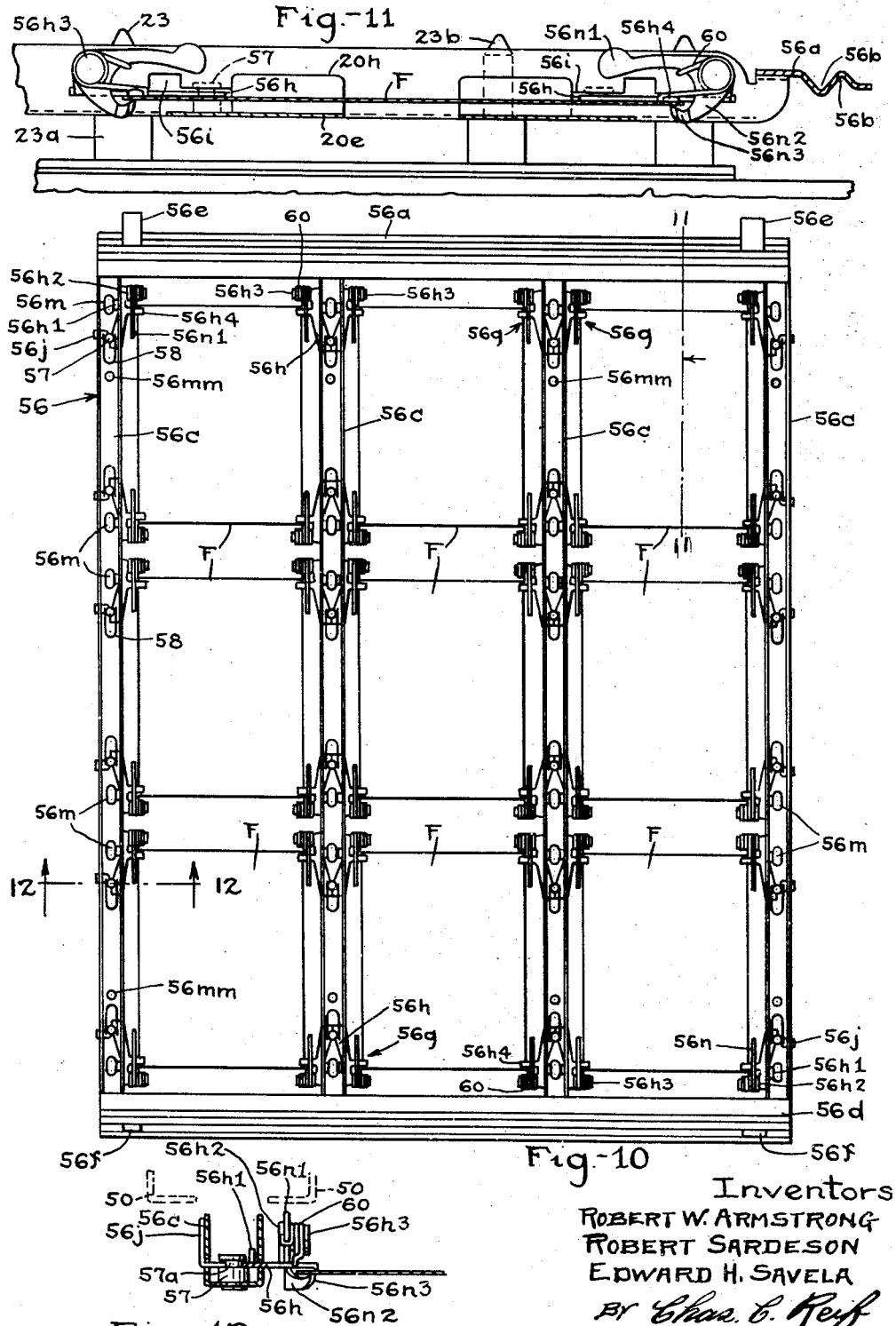

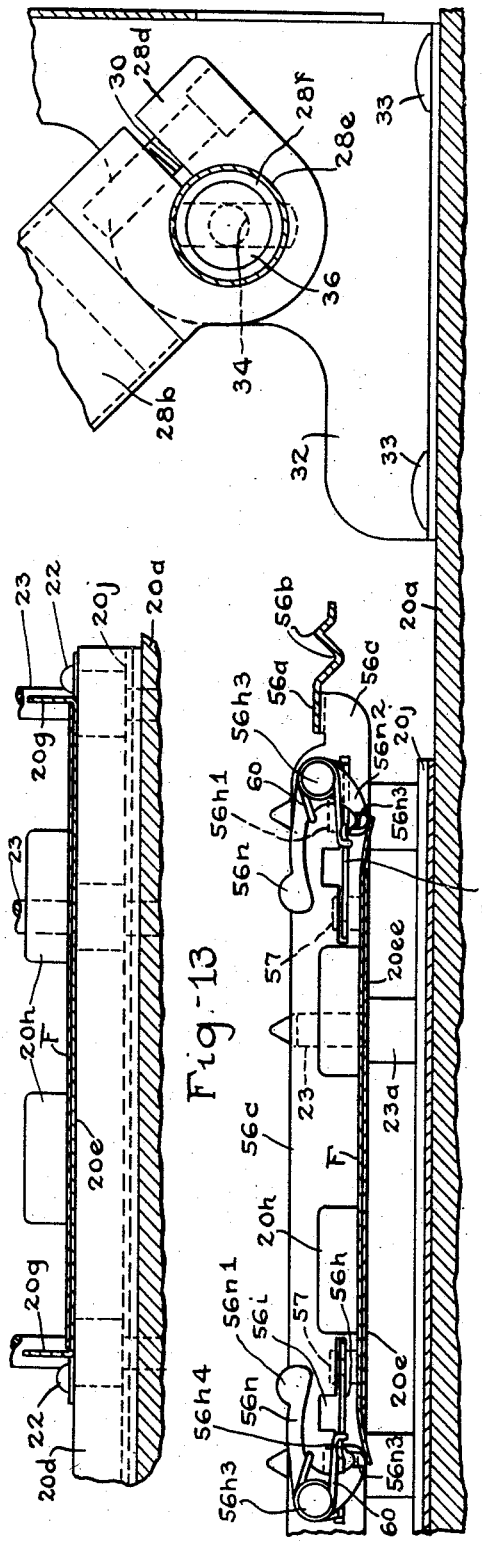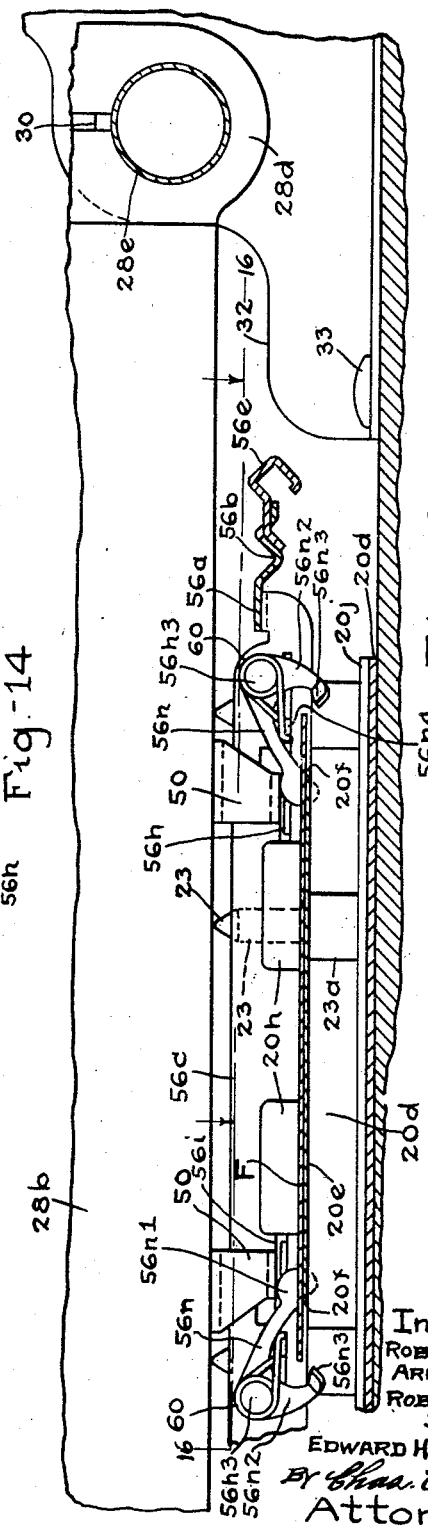

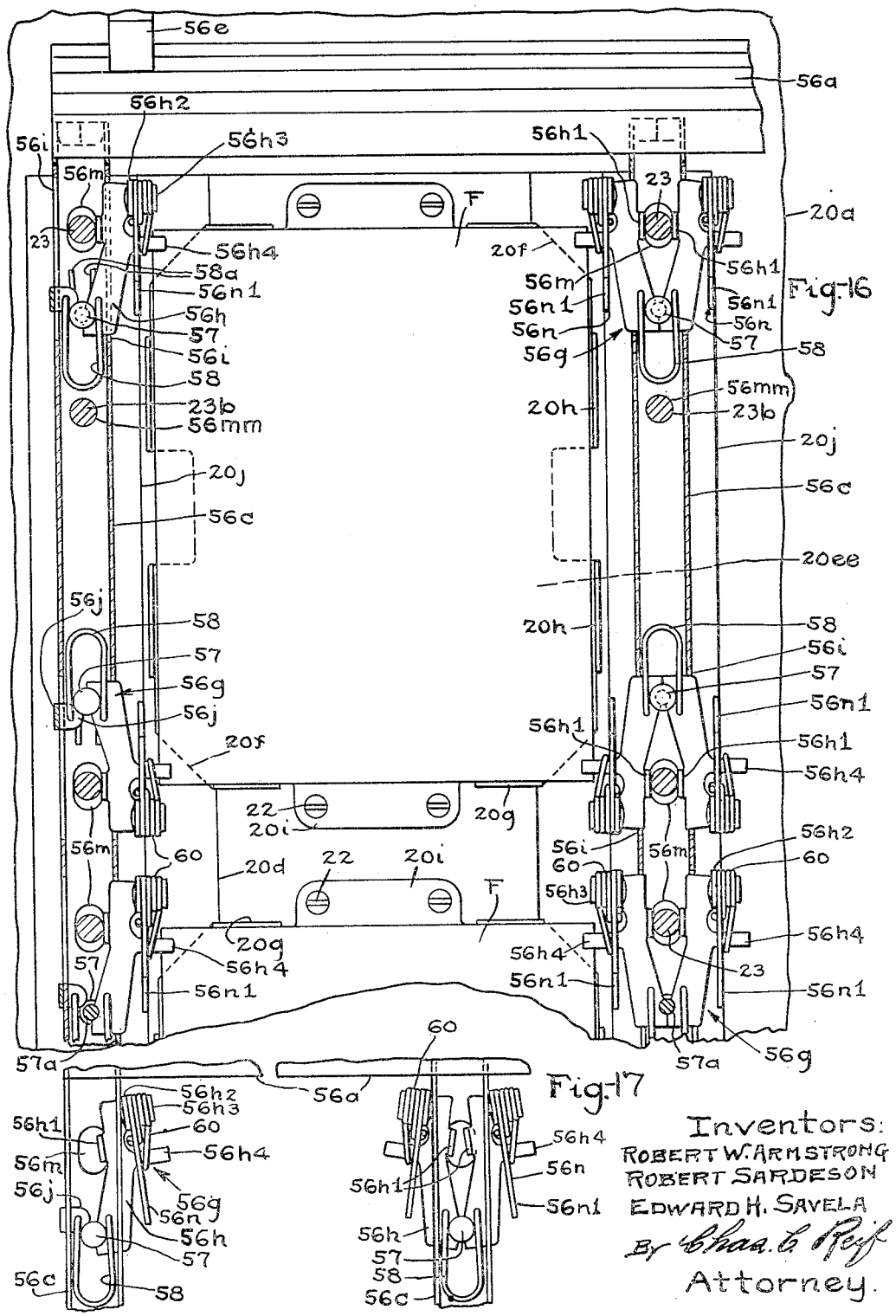

Patented Feb. 14, 1950

2,497,430

UNITED STATES PATENT OFFICE 2,497,430

FILM LOADING APPARATUS

Robert W. Armstrong, Robert Sardeson, and Edward H. Savela, Minneapolis, Minn., assignors to Pako Corporation, Minneapolis, Minn., a corporation of Delaware Application September 15, 1945, Serial No. 616,597

10 Claims. (Cl. 95—100)

This invention relates to a film-loading apparatus, or in other words, to an apparatus for positioning and securing cut photographic films in a film hanger. It is the practice in establishments where photographic films are processed to handle separate comparatively small films and these are placed in a film hanger to be supported therein while they are submerged in the various processing solutions. It is desirable to have a hanger and means for loading the same by which the films can be quickly and effectively placed in and secured in the hanger. Films are now handled in very large numbers and it is almost prohibitive to have to handle each film separately and place it in a hanger. It is also desirable with some films to hold the same without piercing or puncturing the films.

It is an object of this invention therefore to provide a film-loading apparatus by means of which a plurality of cut films can be easily and quickly loaded into a film hanger and held therein without being punctured.

It is another object of the invention to provide a simple and efficient apparatus comprising a novel hanger and means cooperating therewith for loading films into the hanger so that the films will be securely held in the hanger without being pierced and will also be placed under tension.

It is also an object of this invention to provide a film-loading apparatus comprising a support having a surface upon which a film can be laid, said surface being of less area than said film so that said film will have projecting portions extending beyond said surface, a hanger having a plurality of pairs of gripping means, said gripping means being swingable about axes substantially at right angles to said surface, resilient means normally moving and holding the gripping means of each pair in positions remote from each other, each of said gripping means comprising swingable jaws normally spring pressed to closed gripping position, said support having means for supporting said hanger with said pairs of gripping means adjacent the ends respectively of said film and adjacent the corners of said film, said support having means thereon adapted to engage said gripping means when said hanger is placed on said support to move the gripping means of each of said pairs toward each other together with a member movable toward said hanger and having spaced means thereon adapted to engage one of the jaws of each of said gripping means and swing the same against the adjacent projecting portion of said film to bend said portion about the edge of said surface until said jaw passes the edge of said film so that said portion will snap back and be positioned between said jaws whereby when said member is moved away from said support said film will be gripped by said gripping means and when said hanger is removed from said support the gripping means of each of said pairs will be moved away from each other to tension said film.

It is a further object of the invention to provide a film-loading apparatus comprising a support having a plurality of spaced surfaces adapted to have films placed thereon, said surfaces being of smaller areas than the areas of said films respectively so that each of said films has projecting portions extending beyond one of said surfaces respectively, a hanger having a plurality of pairs of spaced gripping means thereon, said gripping means being swingable about axes disposed substantially at right angles to said surfaces and normally held by resilient means with the gripping means of each pair in positions remote from each other, each of said gripping means comprising a pair of swingable jaws normally spring pressed to closed gripping position, said support having means thereon engaging said gripping means when said hanger is placed on said support to swing the gripping means of each pair toward each other together with a member movable toward said hanger having spaced means thereon for engaging one of the jaws of each of said gripping means and moving the same against the adjacent film to bend said projecting portion of said film about the edge of said surface until said jaw passes the edge of said film so that said film will snap back in position between said jaws whereby when said member is moved away from said support said gripping means will grip said films adjacent the corners thereof and when said hanger is lifted from said support the gripping means of each pair will move away from each other to tension said films.

These and other objects and advantages of the invention will be fully set forth in the following description made in connection with the accompanying drawings in which like reference characters refer to similar parts throughout the several views and in which:

Fig. 1 is a plan view of the device, certain parts being broken away;

Fig. 2 is a longitudinal vertical section taken on line 2—2 of Fig. 1, as indicated by the arrows;

Fig. 3 is a vertical section taken substantially on line 3—3 of Fig. 1, as indicated by the arrows;

Fig. 4 is a vertical section taken on line 4—4 of Fig. 1, as indicated by the arrows;

Fig. 5 is a perspective view of a bushing used;

Fig. 6 is a plan view of a device with the hanger in position thereon, certain parts being broken away;

Fig. 7 is a transverse vertical section taken substantially on line 7—7 of Fig. 6;

Fig. 8 is a view in side elevation of the device in normal position, some parts being broken away;

Fig. 9 is a transverse vertical section taken on line 9—9 of Fig. 8, as indicated by the arrows;

Fig. 10 is a plan view of the hanger used, showing films therein;

Fig. 11 is a partial section of the hanger taken on line 11—11 of Fig. 10, as indicated by the arrow;

Fig. 12 is a vertical section taken on line 12—12 of Fig. 10, as indicated by the arrows, a portion of the loading apparatus being shown in dotted lines;

Fig. 13 is a vertical section taken substantially on line 13—13 of Fig. 1, as indicated by the arrows and shown on an enlarged scale;

Fig. 14 is a longitudinal vertical section taken substantially on line 14—14 of Fig. 6, as indicated by the arrows;

Fig. 15 is a view similar to Fig. 14, showing the parts in different positions;

Fig. 16 is a partial horizontal section taken substantially on line 16—16 of Fig. 15, as indicated by the arrows and shown on an enlarged scale; and Fig. 17 is a partial view similar to Fig. 16, showing the parts in different positions.

Referring to the drawings, a device is shown comprising a base member or support 20. Member 20 has a portion 20a of platelike form and while this could be made of various materials, in practice it has been made of wood or plastic. Portion 20a has secured to its underside supporting portions 20b, illustrated as in the form of channels, facing upwardly and having their flanges bent outwardly to engage the bottom of portion 20a to which they are secured by the headed screws 21. Member 20a has secured to the top thereof spaced members 20d, said members extending longitudinally of portion 20a and each comprising a raised central portion, illustrated as in the form of a channel, having its open side directed downwardly and having its flanges bent outwardly at right angles to engage the top of portion 20a. The members 20d support a plurality of portions 20e formed of comparatively thin sheet material, said portions 20e projecting beyond the sides of portions 20d. Portions 20e are shown in plan in Fig. 1 and are of general rectangular form but the same have their corners cut away, as shown at 20f in Fig. 1. Portions 20e have parts 20g and 20h bent into and disposed in vertical planes at their ends and sides respectively. Portions 20e also have projecting lugs 20i at their ends and fastening means such as screws 22 secure the same to the members 20d. The members 20e have top supporting surfaces 20ee and it will be seen in Figs. 1 and 16 that these surfaces are of less area than the films F respectively which are placed thereon so that said films F have projecting portions extending beyond surfaces 20ee, said portions as illustrated being the corner portions of said films. Strips 20j overlie the adjacent edges of portions 20d and extend longitudinally of member 20a. Pins or studs 23 have enlarged portions 23a, the bottoms of which engage strips 20j, said studs extending vertically through member 20a and having nuts 24 secured to their lower threaded ends, said nuts engaging washers 25 engaging the bottom of member 20a. Members 23 have upwardly projecting pointed ends. While the number of portions 20e can be varied, in Fig. 1 nine of said portions are shown arranged in three longitudinal rows and there are seven of the members 23 projecting from each strip 20j. It will be seen that there is one of the pins or studs 23 adjacent the corners of portion 20e and that there is an additional member 23 adjacent one end member 23 in each row.

As shown in Fig. 8, a member or frame 28 is provided, the same having an end portion 28a, illustrated as of tubular form, extending transversely thereof and extending through spaced longitudinally extending portions 28b. Members 28b, as shown in Fig. 4 are of channel form with their open sides facing downwardly, the same having their flanges turned inwardly at the bottom. Said members 28b at their forward ends have received therein blocks 28c having slits or kerfs at their lower sides, said blocks being bored to have member 28a pass therethrough and being clamped on said member by clamping screws 29. The blocks 28c extend into the ends of members 28b and are secured therein in any suitable manner, as by welding. Blocks 28d, similar to blocks 28c but disposed reversely thereto, are secured in the other ends of member 28b and are clamped to an end member 28e, shown as of tubular form, by the clamping screws 30. A member 28e extends transversely of and between members 28b at their other or rear ends. Brackets 32, shown as formed of sheet metal and having parallel side portions extending longitudinally of member 20a, are provided, the same having inwardly turned bottom portions secured to member 20a by the headed and nutted bolts 33. The member 28e is provided with a bushing 28f at each end of which is journaled on a cylindrical member 36 supported in the outer side of each bracket 32 by a screw 34 threaded therein. A washer 35 engages the outer end of member 36 and is engaged by the head of screw 34. The frame 28 is thus swingable about the axis of member 28e. The brackets 32 extend upwardly above member 28e and have grooved studs 37 secured at the inner side of one of their side portions in any suitable manner, as by riveting, and each of said brackets also has secured therein adjacent its top portion a buffer plug 38 which will be made of rubber or some similar material. Plate brackets 39 have a portion secured to the top of the outer members 28b by the rivets 40 and also have a terminal end 39a disposed at a suitable angle so as to engage the buffer plugs 38 when member 28 is in its upper position. Said member 28 is normally moved to its upper position by tensile coiled springs 42 having one of their ends secured to the studs 37 respectively, and the other of their ends secured to similar studs 43 which may be disposed in any one of a plurality of holes 28g formed in one side of the outer members 28b. The outer members 28b have secured therein adjacent their free ends, headed screws 44. Screws 44 extend upwardly through said members 28b and are held therein by nuts 45 disposed at the inner sides of members 28b and by nuts 46 disposed at the lower sides thereof, said nuts engaging washers 47, which in turn engage the lower sides of members 28b. The heads of screws 44 are adapted to engage the top of member 20a and form stops acting to position the lower sides of members 28b parallel to the top of member 20a. It will be seen that screws 44 can be moved to and held in various positions. Each member 28b has secured to its lower side a plurality of spaced members 50. Members 50 are in the form of channels having their sides directed downwardly and bent inwardly toward each other at right angles, as shown in Fig. 9. Each member 50 is secured to its member 28b by a headed screw 51 passing through the top thereof and threaded into a nut 52 disposed within member 28b and which engages the tops of the in-turned flanges thereof. Member 50 is preferably pressed upwardly or offset slightly to have a projecting portion 50a which will seat between the in-turned flanges of member 28b and thus act to hold member 50 from turning. Members 50 are of trapezoidal shape in side elevation, as clearly shown in Fig. 8.

A hanger of special form is used with the device above described, which hanger is shown in Figs. 10, 11, 12, 16 and 17, as well as in some of the other views. Said hanger, which will be designated generally as 56, comprises an end plate 56a extending transversely at the top thereof, the same being bent to have rib-forming grooves 56b therein. The inner side of plate 56a is secured in any suitable manner, as by welding, to the in-turned flanges of spaced parallel and longitudinally extending channels 56c. Channels 56c extend to the other end of the hanger and an end plate 56d, similar to end plate 56a, is connected to the in-turned flanges thereof in any suitable manner, as by welding. End plate 56a is shown as provided with a pair of upwardly or outwardly extending lugs 56e having reversely bent ends, and end plate 56d is provided with a pair of spaced apertures or slots 56f longitudinally alined respectively with lugs 56e and into which similar lugs on another hanger could be received. Each channel member 56c has secured in its web portion and extending upwardly between its sides a plurality of pivot members 57. Pivot members 57 are secured in said web in any suitable manner as by riveting, as shown in Fig. 12, and each one has an annular groove 57a adjacent its top portion. The pivot members 57 are engaged by one jaw portion of gripping members 56g. Said jaw portion, which will be designated 56h, is provided with a semi-circular recess adjacent one end which fits around the reduced portion of stud 57 and is disposed in the groove 57a. In the outer members 56c there is just one jaw portion 56h which engages the pivots 57, but in the inner members 56c each pivot 57 is engaged at opposite sides by adjacent members 56h of the gripping members 56g, as clearly shown in Figs. 10 and 17. The members 56h extend laterally through slots 56i formed in the sides of the channel members 56c. The members 56h are held in position against the pivots 57 by springs 58. While said springs 58 might be variously formed, in practice they have been quite simply and efficiently made of a spring wire bent into U-shape and having ends bent downwardly and then bent to extend substantially parallel to the sides of said U. Springs 58 thus have offset terminal portions 58a. In the inner members 56c the downturned portions of the spring 58 pass through holes formed in members 56h adjacent pivots 57 and have their terminals disposed at one side of members 56h. In the side members 56c one side of the spring 58 passes through a hole in the member 56h and the other side passes through a hole in a small lug 56j secured in one side of channel 56c, as shown in Figs. 16 and 17. The terminal ends of the spring 58 engage the sides of the channels 56c and the plane of the U-shaped portion or bight extends parallel to the web of the channel. While either side of the hanger might be considered the top side, for convenience in description the side at the open side of the channels 56c will herein be referred to as the top side. The jaw portion 56h has a portion or lug 56h1 extending upwardly toward the open side of the channel, said portion being disposed some distance from the pivot 57 and a short distance from the free end of the member 56h. The web portion of each of the channels 56c is provided with a plurality of apertures 56m, the same being of oblong or elliptical shape with their long axes disposed in the longitudinal center of said channels and with their central transverse axes substantially alined with the longitudinal centers of the lugs 56h1. As shown in Fig. 10, there are thus six of these apertures 56m and they are spaced the same as the pins 23. There is an additional circular aperture 56mm extending through the web of each of the channels 56c and this is located some distance from one of the end apertures 56m. This additional aperture 56mm is adapted to aline centrally with the additional pin 23 above referred to. The member or portion 56h has a vertically extending lug 56h2 disposed at the outer side of channel 56c and a headed pivot member 56h3 is riveted therein. Portion 56h also has a horizontally projecting lug 56h4 which is disposed outside of channel 56c. Another jaw 56n has an apertured portion pivoted on pivot 56h3 closely adjacent lug 56h2, said jaw being of general bell crank shape and having an arm 56n1 extending longitudinally of channel 56c and substantially parallel thereto at one side thereof, the same having an enlarged free end with a rounded upper surface. The other arm 56n2 of the jaw 56n extends downwardly below pivot member 56h3 and is considerably shorter than arm 56n1, the same having a somewhat hook-shaped terminal portion 56n3 which extends away from the side of channel 56c. This is clearly shown in Figs. 11 and 12. A coiled torsion spring 60 is carried on pivot member 56h3 having one end extending a short distance along arm 56n1 and hooked thereunder and having another arm extending from the bottom of pivot 56h3 over lug 56h4, the same being bent around the bottom of lug 56h4. Spring 60 acts normally to swing member 56n and to swing arm 56n1 upwardly and bring portion 56n3 against the outer side of lug 56h4. Portion or lug 56h4 and portion 56n3 thus form the engaging portions of the jaws of the gripping means 56g.

When the films F are to be loaded in the hanger, the same are distributed and laid on the surfaces 20ee and they are gauged and positioned on said surfaces by the portions 20h. The operation of placing the films on surfaces 20ee can be very rapidly performed. The operator now takes the hanger 56 and places the same on the base member, the pins 23 extending through the apertures 56m. The pins 23 are only slightly smaller in diameter than the transverse diameter of the apertures 56m so that the hanger is thus accurately positioned transversely. The extra pin 23, which may be designated as 23b, passes through the additional aperture 56mm. The pin 23b fits snugly in aperture 56mm and this locates the hanger very accurately longitudinally of the base 20. The operator presses down on the hanger and pins 23 thus pass upwardly through apertures 56m and engage the sides of lugs 56h1. Said lugs 56h1 are of course first engaged by the inclined sides of the pointed ends of pins 23a and are cammed and moved laterally as pins 23 pass upwardly through apertures 56m. The gripping means of each pair of gripping means which is disposed adjacent the end of a film are thus moved from positions remote from each other toward each other to positions closer to each other. This lateral movement of the gripping means is caused against the tension of springs 58. It will be seen that in the central channels 56c the pins 23 engage two of the gripping means or the lugs 56h1 thereof while in the outer channels said pins only engage one of the gripping means or one of the lugs 56h1 thereof. Members 56h are moved laterally about the axes of pivots 57 and both jaws of the gripping means are thus moved. The position of the gripping means at this point is clearly shown in Fig. 16. The webs or bottoms of the channels 56c seat on top of the portions 23a after the hanger is pushed down to position on the support, as clearly shown in Fig. 11. The operator now swings frame 28 downwardly and this can be done by grasping the member 28a and swinging the frame down about the axis of member 28e against the tension of springs 42. The stop member 44 is adjusted so that when it engages the top of portion 20a the bottom of the members 28b will be substantially parallel with the surfaces 20ee. When frame 28 is thus moved downwardly the members 50 thereon aline with the curved upper edges at the ends of jaw members 56n1 and said jaw members are engaged by members 50 and moved downwardly. As the arms 56n1 are moved downwardly this swings the member 56n2, and the jaw portion 56n3 thereof which was disposed above and against the film F, as shown in Fig. 14, is moved to press downwardly on said film. This movement of the jaw portion 56n3 bends the projecting corner portion of the film F about the edge of the surface 20ee, as shown in Fig. 14. The movement of jaw portion 56n3 continues until it passes the edge of the film and the corner portion or projecting portion of the film then snaps back to horizontal position, as shown in Fig. 15, and comes into position between the gripping portions 56h4 and 56n3 of the gripping jaws of the gripping means. Owing to the position of jaw portion 56n3 extending away from the side of channel 56c, said portion swings somewhat away from the end of the film, as shown in Fig. 15. The operator now releases frame 28 and said frame is moved upward to normal position by the springs 42. When the frame so moves upwardly, members 50 move away from the arms 56n1 and these arms and jaw member 56n then swing upwardly to normal position due to the tension of springs 60, which position is shown in Fig. 11. When jaws 56n move to this position each corner portion of each film is tightly gripped between the jaw portions 56h4 and 56n3, as clearly shown in Figs. 11 and 12. The films are now very accurately and very firmly secured in and held in the gripping means of the hanger. The operator now lifts the hanger from the base member 20. When the hanger is so lifted, the same is of course withdrawn from pins 23 and the pressure of these pins against members 56h and lugs 56h1 thereof is released. The springs 58 now swing members 56h laterally about the axes of pivots 57 toward their remote positions. The gripping means at each end of the film are thus swung away from each other and the film is nicely and properly tensioned by springs 58. The films F are thus not only accurately and firmly held by the gripping means in the hanger but they are properly held under the desired tension. It is desirable to have the films under tension so that they will be held in flat position in one plane during the subsequent processing and drying.

From the above description it will be seen that we have provided a comparatively simple and highly efficient device for simultaneously loading a plurality of films into a film hanger. As stated, the operation is quite rapid. The operator can quickly distribute the films onto the surfaces 20e and quickly place the hanger in position. The frame 28 can be swung down with great rapidity. In fact it has been found in practice that if it is actually slammed down with great speed the operation of gripping the films is performed even better than if it is moved slowly. The apparatus constitutes a great advance in the photographic art. It is believed applicants are the first to provide a device where a plurality of comparatively small cut films can be quickly and simultaneously loaded into a hanger and firmly held therein in tensioned condition. The apparatus will save an immense amount of labor. The parts of the device are all strong and rugged and are made of easily procured material. The apparatus has been amply demonstrated in actual practice and found to be very successful and efficient and is being commercially made.

The structure of the apparatus is such that the operator can place films therein and operate the same with gloved hands. This is an important feature and one which is really essential in the use of the more sensitive films, some of which are very sensitive to finger marks. The apparatus is also so constructed that it can be operated in the dark merely by the sense of touch. This is also very desirable as such films such as panchromatic films are sensitive to any kind of light. The portion of the film engaged by the gripping means of the hanger is limited to an extremely narrow boarder and no deformation is caused in the picture or image portion of the film. Such deformation is quite objectionable as it causes distortion if the film is used in a projecting or enlarging machine.

It will, of course, be understood that various changes may be made in the form, details, arrangement and proportions of the apparatus and in the steps and sequence of steps of the method without departing from the scope of applicant's invention, which, generally stated, consists in apparatus capable of carrying out the objects above set forth, such as disclosed and defined in the appended claims.

What is claimed is:

1. A film loading apparatus having in combination, a base having a raised surface on which a photographic film may be laid, said surface being of less area than the area of said film so that said film has projecting portions extending beyond said surface, a film hanger comprising a substantially flat frame having spaced pairs of gripping means mounted thereon, each of said means comprising a pair of spring pressed superposed jaws normally held in closed gripping relation, one of said jaws of each of said pairs of jaws being movable downwardly from its cooperating jaw, said gripping means being mounted for swinging movement about axes at right angles to the plane of said frame, resilient means holding said gripping means of each pair in positions remote from each other and adjacent opposite sides of said film, said base having a portion for supporting said hanger with said pairs of gripping jaws over the corner portions of said film respectively, means mounted on said base for respectively engaging said gripping means to swing a gripping means of each of said pairs toward each other and toward the center of each film respectively against the tension of said resilient means as said frame is moved downwardly toward said portion, and means movable toward said support from above the same for moving said one of said jaws against said film in a direction substantially perpendicular thereto to bend the edge portion of said film downwardly about the edge of said surface until said jaw moves past said portion of said film and said film snaps back into position against the other cooperating jaw and is positioned between said jaws whereby when said last mentioned means is moved away from said base and said hanger is lifted from said support, said film will be gripped by the spring pressure of said jaws and tensioned by said resilient means swinging said resilient means of each pair away from each other.

2. A film loading apparatus having in combination, a base comprising a plurality of spaced raised surfaces on which films can be placed from above, said surfaces being of less dimension than said films thereon so that said films have projecting portions extending beyond said respective surfaces, a film hanger comprising a substantially flat frame, spaced pairs of gripping means mounted on said frame, said gripping means being swingable about axes at right angles to the plane of said frame, resilient means normally holding said gripping means of each pair in positions remote from each other and adjacent opposite sides of a film, each of said gripping means comprising a pair of swingable superposed gripping jaws, springs normally moving the jaws of each of said gripping means to and holding the same in closed gripping position, one of the jaws of each of said pairs of jaws being movable downwardly from its cooperating jaw, said base having portions for supporting said hanger with the gripping means of said pairs over the projecting corner portions of said films respectively, spaced members mounted on said base for engaging and swinging a gripping means of each of said pairs toward each other and toward the center of the respective film as said hanger is moved downwardly by the operator toward said last mentioned portions, a member pivoted to said base and movable toward said support from above having spaced means thereon positioned to engage said one of said jaws of each of said pairs of jaws to move the same downwardly against the tension of said springs respectively and against the projecting portion of the adjacent film to bend said portion about the edge of said surface until said jaw passes said edge portion and said film snaps back into position between said jaws whereby when said hanger is lifted and said member is raised, said gripping means will grip said film by pressure of said springs and said gripping means of each pair will swing away from each other and tension said film by action of said resilient means.

3. The structure set forth in claim 2, certain of said gripping means for adjacent films being disposed side by side on said hanger and between adjacent films and certain of said members on said base being positioned to engage a plurality of said gripping means to swing two of the same simultaneously.

4. A film loading apparatus having in combination, a base comprising a support having a raised surface on which a film can be laid from above, said surface being of less area than the area of said film so that said film has portions projecting beyond said surface, a film hanger comprising a substantially flat frame, spaced pairs of gripping means mounted on said frame, pivots on said frame about which said gripping means are swingable about axes substantially at right angles to the plane of said frame, resilient means on said frame tending to swing said gripping means of each pair away from each other, each of said gripping means comprising a pair of swingable superposed gripping jaws, springs normally urging said jaws to and holding the same in closed gripping position, one of said jaws of each pair of jaws being swingable downwardly away from its cooperating jaw, said base having portions for supporting said hanger in a plane parallel to the plane of said surface, spaced members on said base engaging said frame to position the same with the jaws of said gripping means disposed over the corner portions of said film respectively, spaced upwardly projecting tapered pins mounted on said base positioned to engage said gripping means respectively, when said hanger is moved downwardly onto said supporting portions on said base, and to swing the gripping means of each of said pairs toward each other against the tension of said resilient means, a second member hinged to said base and movable toward and from said support from above, said second member having spaced members thereon positioned to engage said one of the jaws of each of said pairs of jaws to swing the same downwardly against said projecting portions of said film to bend the same about the edges of said surface until said jaws pass the edges of said film and said film snaps back into position between said jaws whereby when said member is raised said jaws will be moved by said springs to grip the corner portions of said film and when said hanger is moved upwardly from said support the gripping means of each pair will be swung away from each other by resilient means to tension said film.

5. A film loading apparatus having in combination, a base comprising a plurality of spaced raised surfaces adapted to have films laid thereon respectively, each of said films having a greater area than its respective surface so that said films have portions projecting beyond the edges of said surfaces respectively, members extending longitudinally of said support between said surfaces and at the outer sides of said surfaces, spaced cam members projecting upwardly from said first mentioned members, a film hanger comprising a substantially generally rectangular frame, a plurality of groups of gripping means mounted on said frame and spaced longitudinally thereof, each group comprising spaced pairs of gripping means, pivots on said frame about which said gripping means are swingable about axes extending substantially at right angles to the plane of said frame, resilient means holding the gripping means of each of said pairs in positions remote from each other and adjacent opposite sides of a film, each of said gripping means comprising a pair of swingable superposed jaws, springs normally urging said jaws to and holding the same in closed gripping relation, one of the jaws of each of said pairs of jaws having an operating arm and being movable downwardly away from its cooperating jaw, said base having portions thereon for supporting said hanger in a plane substantially parallel to the plane of said surfaces, spaced members on said base positioned to engage said frame for locating said hanger with said jaws of said gripping means over the corner portions of said films respectively, said gripping means having portions adapted to be engaged by said cam members when said hanger is placed over said base and moved onto said supporting portions to cam and swing the gripping means of each of said pairs toward each other, a second member pivoted about a horizontal axis to one end of said base and movable toward said support from above, spaced members carried on said second member each being positioned to engage said operating arm of said one jaw respectively to swing said jaw downwardly against the projecting portion of the adjacent film and bend said film about the edge of its supporting surface until said jaw passes the edge of said film so that said film will spring back and come into position between said jaw and its cooperating jaw whereby when said second member is raised said jaws will be moved by said springs to grip said films respectively and when said hanger is lifted from said base said resilient means will swing said gripping means of each pair away from each other to tension said films.

6. The structure set forth in claim 5, said cam members comprising upstanding pointed pins for engaging said gripping means and said hanger frame having openings through which said spaced members on said base pass for locating said hanger.

7. The structure set forth in claim 5, said second member having spaced longitudinally extending members on its lower side from which said operating members project.

8. The structure set forth in claim 5, said surfaces having means projecting upwardly at the sides and ends thereof for positioning films thereon.

9. A film loading apparatus having in combination, a substantially rectangular base, a plurality of spaced plates secured to said base and having raised portions with top surfaces, said surfaces being disposed substantially in one plane, said portions being alined longitudinally and transversely of said base, pins spaced longitudinally of said base projecting upwardly therefrom at the outer sides of each of said surfaces, said pins having tapering upper ends, a film hanger comprising a substantially flat frame, a plurality of groups of gripping means mounted on said frame, each group comprising spaced pairs of gripping means, spaced pivots on said frame about which said gripping means are swingable about axes disposed substantially at right angles to the plane of said frame, resilient means on said frame holding the gripping means of each of said pairs in position remote from each other adjacent opposite sides of the film, each of said gripping means comprising a pair of relatively swingable superposed jaws, springs normally urging said jaws to and holding the same in closed gripping position, one of each said jaws of each of said pairs of jaws being swingable downwardly from its cooperating jaw, said base having portions for supporting said frame with its plane substantially parallel to the plane of said surfaces, spaced pins on said base for engaging said frame and positioning the same with said jaws of said gripping means disposed over the corner portions of said films respectively, said gripping means having surfaces adapted to be engaged by said pins when said hanger is placed over said support and moved downwardly onto said supporting portions, said pins camming and swinging the gripping means of each of said pairs toward each other against the tension of said resilient means, a second frame hinged to one end of said support and swingable over and toward and from said support, said frame having spaced members at its lower side having bottom portions disposed substantially in one plane, said portions being positioned respectively to engage said one of the jaws of each of said gripping means when said frame is swung downwardly for swinging said jaw downwardly against the projecting portion of the adjacent film to bend said film about the edge of its supporting surface until said jaw passes the edge of said film so that said film will spring back and come into position between said jaw and its cooperating jaw whereby when said second frame is raised, said springs will swing said jaws of each pair to grip said films respectively and when said hanger is lifted from said base said gripping means of each pair will be swung away from each other by said resilient means to tension said films respectively.

10. The structure set forth in claim 9, and means on said second frame limiting the movement thereof toward said support with the plane of the bottom portions of said members carried on said frame substantially parallel with the plane of said surfaces, said last mentioned means being movable to different position.

ROBERT W. ARMSTRONG.
ROBERT SARDESON.
EDWARD H. SAVELA.

REFERENCES CITED

The following references are of record in the file of this patent:

UNITED STATES PATENTS

| Number | Name | Date |
|---|---|---|
| 1,113,288 | Barnes et al. | Oct. 13, 1914 |
| 1,237,563 | Schoenberg | Aug. 21, 1917 |
| 1,666,895 | Gollomb | Apr. 24, 1928 |
| 1,778,140 | Becker | Oct. 14, 1930 |
| 1,825,310 | Engstrom | Sept. 29, 1931 |
| 1,854,931 | Gollomb | Apr. 19, 1932 |
| 1,858,576 | Bornmann | May 17, 1932 |
| 2,078,078 | Hood | Apr. 20, 1937 |
| 2,180,010 | Martin | Nov. 14, 1939 |
| 2,290,831 | Fink | July 21, 1942 |

FOREIGN PATENTS

| Number | Country | Date |
|---|---|---|
| 376,567 | France | June 17, 1907 |
| 207,952 | Great Britain | Dec. 13, 1923 |